US010659965B2

(12) United States Patent
Fujii

(10) Patent No.: US 10,659,965 B2
(45) Date of Patent: May 19, 2020

(54) COMMUNICATION TERMINAL APPARATUS, TERRESTRIAL CELLULAR BASE STATION AND MOBILE COMMUNICATION SYSTEM

(71) Applicant: SoftBank Corp., Tokyo (JP)

(72) Inventor: Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 16/084,685

(22) PCT Filed: Jan. 31, 2017

(86) PCT No.: PCT/JP2017/003465
§ 371 (c)(1),
(2) Date: Sep. 13, 2018

(87) PCT Pub. No.: WO2017/159085
PCT Pub. Date: Sep. 21, 2017

(65) Prior Publication Data
US 2019/0075468 A1 Mar. 7, 2019

(30) Foreign Application Priority Data
Mar. 14, 2016 (JP) ................. 2016-049568

(51) Int. Cl.
*H04W 16/04* (2009.01)
*H04W 84/06* (2009.01)
(Continued)

(52) U.S. Cl.
CPC ........ *H04W 16/04* (2013.01); *H04B 7/18513* (2013.01); *H04B 7/18539* (2013.01);
(Continued)

(58) Field of Classification Search
CPC . H04W 16/14; H04W 24/04; H04W 72/0446; H04B 7/18519
See application file for complete search history.

(56) References Cited

U.S. PATENT DOCUMENTS

2004/0072539 A1* 4/2004 Monte ................ H04B 7/18563
455/13.4
2008/0242238 A1* 10/2008 Singh ................. H04B 7/18513
455/77

(Continued)

FOREIGN PATENT DOCUMENTS

JP 2010-524299 A 7/2010
JP 2014-064219 A 4/2014

(Continued)

OTHER PUBLICATIONS

Tadashi Minowa, et al., "Satellite/Terrestrial Integrated Mobile Communication System for Nation's Security and Safety," Institute of Electronics, Information, and Communication Engineers, B vol. J91-B, No. 12, pp. 1629-1640, 2008.

*Primary Examiner* — Melanie Jagannathan
(74) *Attorney, Agent, or Firm* — Muirhead and Saturnelli, LLC

(57) ABSTRACT

A communication terminal apparatus, a terrestrial cellular base station and a mobile communication system are provided, which are capable of being shared in a terrestrial cellular mobile communication system and a satellite mobile communication system, preventing an interference between both systems and improving a spectral efficiency in a downlink of the terrestrial cellular mobile communication system, by simple switching control of radio resources. When the communication terminal apparatus is located in an area of the terrestrial cellular mobile communication system, all of time slots allocated to the terrestrial cellular mobile communication system and at least a part of time slots allocated (Continued)

to the satellite mobile communication system are used in a downlink, and all of time slots allocated to the terrestrial cellular mobile communication system are used and time slots allocated to the satellite mobile communication system are not used in an uplink.

10 Claims, 7 Drawing Sheets

(51) Int. Cl.
    *H04W 72/04*     (2009.01)
    *H04B 7/185*     (2006.01)
    *H04W 28/08*     (2009.01)
    *H04B 7/204*     (2006.01)
    *H04W 84/04*     (2009.01)

(52) U.S. Cl.
    CPC .......... *H04B 7/2041* (2013.01); *H04W 28/08* (2013.01); *H04W 72/0446* (2013.01); *H04W 72/0486* (2013.01); *H04W 84/06* (2013.01); *H04W 84/042* (2013.01)

(56) References Cited

U.S. PATENT DOCUMENTS

| | | | | |
|---|---|---|---|---|
| 2010/0272038 | A1* | 10/2010 | Hamalainen | H04B 7/18563 370/329 |
| 2011/0064017 | A1* | 3/2011 | Hong | H04H 20/26 370/312 |
| 2013/0315112 | A1 | 11/2013 | Gormley et al. | |
| 2014/0112302 | A1* | 4/2014 | Bacquet | H04B 7/18523 370/330 |
| 2015/0079977 | A1* | 3/2015 | Park | H04B 7/18513 455/427 |
| 2016/0267527 | A1* | 9/2016 | Flood | G06Q 30/0246 |
| 2016/0345189 | A1* | 11/2016 | Miyagawa | H04W 16/14 |

FOREIGN PATENT DOCUMENTS

| | | |
|---|---|---|
| WO | WO 2008/118593 A1 | 10/2008 |
| WO | WO 2015/114729 A1 | 1/2014 |
| WO | WO 2015/114729 A1 | 8/2015 |

\* cited by examiner

COMMUNICATION TERMINAL APPARATUS, TERRESTRIAL CELLULAR BASE STATION AND MOBILE COMMUNICATION SYSTEM

TECHNICAL FIELD

The present invention relates to a mobile communication system, and a communication terminal apparatus and a terrestrial cellular base station in the mobile communication system.

BACKGROUND ART

A communication terminal apparatus is conventionally known, which is capable of using a terrestrial cellular mobile communication system (hereinafter abbreviated as "terrestrial system" as appropriate) via a cellular base station located on the ground and a satellite mobile communication system (hereinafter abbreviated as "satellite system" as appropriate) via an artificial satellite in a same area (for example, refer to Non-Patent Literature 1 and Patent Literature 1).

CITATION LIST

Patent Literature

Patent Literature 1: Japanese Unexamined Patent Application Publication No. 2014-064219.

Non-Patent Literature

Non-Patent Literature 1: Tadashi Minowa and six others, "Satellite/Terrestrial Integrated Mobile Communication System for Security and Safety", The Transactions of the Institute of Electronics, Information and Communication Engineers B, Vol. J91-B, No. 12, pp. 1629-1640, 2008/12.

SUMMARY OF INVENTION

Technical Problem

In the communication terminal apparatus that can be shared in the terrestrial system and the satellite system, there is a problem to improve a spectral efficiency in a downlink of the terrestrial system while avoiding an interference between both systems by a simple switching control of radio resources.

Solution to Problem

A communication terminal apparatus according to an aspect of the present invention, which is a communication terminal apparatus shared in a terrestrial cellular mobile communication system and a satellite mobile communication system, comprises memory means for memorizing allocation information on time slots of radio resources allocated to the terrestrial cellular mobile communication system and the satellite mobile communication system in which a same frequency band is used, so as not to overlap with each other on a time axis between the systems, transceiving means for performing a radio communication by selecting one of a terrestrial cellular mobile communication method and a satellite mobile communication method according to an area in which the communication terminal apparatus is located, and control means for controlling so as to use all of time slots allocated to the terrestrial cellular mobile communication system and at least a part of time slots allocated to the satellite mobile communication system in a downlink to the communication terminal apparatus, and so as to use all of time slots allocated to the terrestrial cellular mobile communication system and none of time slots allocated to the satellite mobile communication system in an uplink from the communication terminal apparatus, based on the allocation information on the time slots of radio resources, when the communication terminal apparatus is located in an area of the terrestrial cellular mobile communication system.

A terrestrial cellular base station according to another aspect of the present invention, which is a terrestrial cellular base station capable of communicating with a communication terminal apparatus in a mobile communication system including a terrestrial cellular mobile communication system and a satellite mobile communication system, comprises memory means for memorizing allocation information on time slots of radio resources allocated to the terrestrial cellular mobile communication system and the satellite mobile communication system in which a same frequency band is used, so as not to overlap with each other on a time axis between the systems, transceiving means for performing a radio communication with a communication terminal apparatus located in an area of an own base station by the terrestrial cellular mobile communication method, and control means for controlling so as to use all of time slots allocated to the terrestrial cellular mobile communication system and at least a part of time slots allocated to the satellite mobile communication system in a downlink to the communication terminal apparatus located in the area of the own base station, and so as to use all of time slots allocated to the terrestrial cellular mobile communication system and none of time slots allocated to the satellite mobile communication system in a uplink from the communication terminal apparatus located in the area of the own station, based on the allocation information on the time slots of radio resource.

According to the communication terminal apparatus and the terrestrial cellular base station, in the downlink in the area of the terrestrial cellular mobile communication system, not only all of the time slots allocated to the terrestrial cellular mobile communication system but also at least a part of the time slots allocated to the satellite mobile communication system are used. Accordingly, it is capable of improving a spectral efficiency of the downlink in the terrestrial cellular mobile communication system. Moreover, in the downlink in the area of the terrestrial cellular mobile communication system, since strength of a signal from the terrestrial cellular mobile communication system is much weaker than strength of a signal from the satellite mobile communication system, even if the time slots allocated to the satellite mobile communication system are used, an influence of interference from the satellite mobile communication system can be reduced to a negligible level.

On the other hand, in the uplink in the area of the terrestrial cellular mobile communication system, all of the time slots allocated to the terrestrial cellular mobile communication system are used, and the time slots allocated to the satellite mobile communication system are not used. Accordingly, it is capable of avoiding an interference of an uplink signal of the terrestrial cellular mobile communication system with an uplink signal of the satellite mobile communication system.

Furthermore, since the radio resources of the satellite mobile communication system, which are controlled so as to switch between the uplink and the downlink in the area of the terrestrial cellular mobile communication system, are time slots that are easy to control, the control for switching the radio resources is easier than when frequencies of the radio resources are controlled to be switched.

In the foregoing communication terminal apparatus, the control means may control to use all of the time slots allocated to the terrestrial cellular mobile communication system and all of the time slots allocated to the satellite mobile communication system in the downlink to the communication terminal apparatus when the communication terminal apparatus is located in the area of the terrestrial cellular mobile communication system.

Moreover, in the foregoing terrestrial cellular base station, the control means may control to use all of the time slots allocated to the terrestrial cellular mobile communication system and all of the time slots allocated to the satellite mobile communication system in the downlink to the communication terminal apparatus located in the area of the own station.

According to the communication terminal apparatus and the terrestrial cellular base station, in the downlink in the area of the terrestrial cellular mobile communication system, by using all of the time slots allocated to the satellite mobile communication system, it is capable of further increasing the spectral efficiency in the downlink of the terrestrial cellular mobile communication system.

In the foregoing communication terminal apparatus, the control means may control so as to change the number of time slots allocated to the satellite mobile communication system, which are used in the downlink to the communication terminal apparatus in the area of the terrestrial cellular mobile communication system, according to a traffic amount of the downlink in the area of the terrestrial cellular mobile communication system.

Moreover, in the foregoing terrestrial cellular base station, the control means may control so as to change the number of time slots allocated to the satellite mobile communication system, which are used in the downlink to the communication terminal apparatus in the area of the own station, according to a traffic amount of the downlink to the communication terminal apparatus in the area of the own base station.

According to the communication terminal apparatus and the terrestrial cellular base station, when the downlink traffic amount in the area of the terrestrial cellular mobile communication system is large, by increasing the number of time slots allocated to the satellite mobile communication system used in that area, it is capable of increasing the spectral efficiency in the downlink of the terrestrial cellular mobile communication system so as to comply with an increase of the traffic amount. Moreover, when the downlink traffic amount in the area of the terrestrial cellular mobile communication system is small, by decreasing the number of time slots allocated to the satellite mobile communication system used in that area, it is capable of reducing the influence of the downlink signal of the satellite mobile communication system to the downlink of the terrestrial cellular mobile communication system.

A mobile communication system according to still another aspect of the present invention, which is a mobile communication system including a terrestrial cellular mobile communication system and a satellite mobile communication system, comprises a terrestrial cellular base station capable of performing a radio communication with a communication terminal apparatus, a satellite base station capable of performing a radio communication with a communication terminal apparatus via a communication relay apparatus of an artificial satellite, and a base-station control apparatus that controls the terrestrial cellular base station and the satellite base station. The terrestrial cellular base station is any one of the terrestrial cellular base stations in the above-described aspects.

Advantageous Effects of Invention

According to the present invention, it is capable of sharing the terrestrial cellular mobile communication system and the satellite mobile communication system, and improving the spectral efficiency of the downlink in the terrestrial cellular mobile communication system while avoiding an interference between both systems by a simple switching control of radio resources.

DESCRIPTION OF EMBODIMENTS

Hereinafter, various embodiments of the present invention will be described with reference to the drawings.

Figure 1:
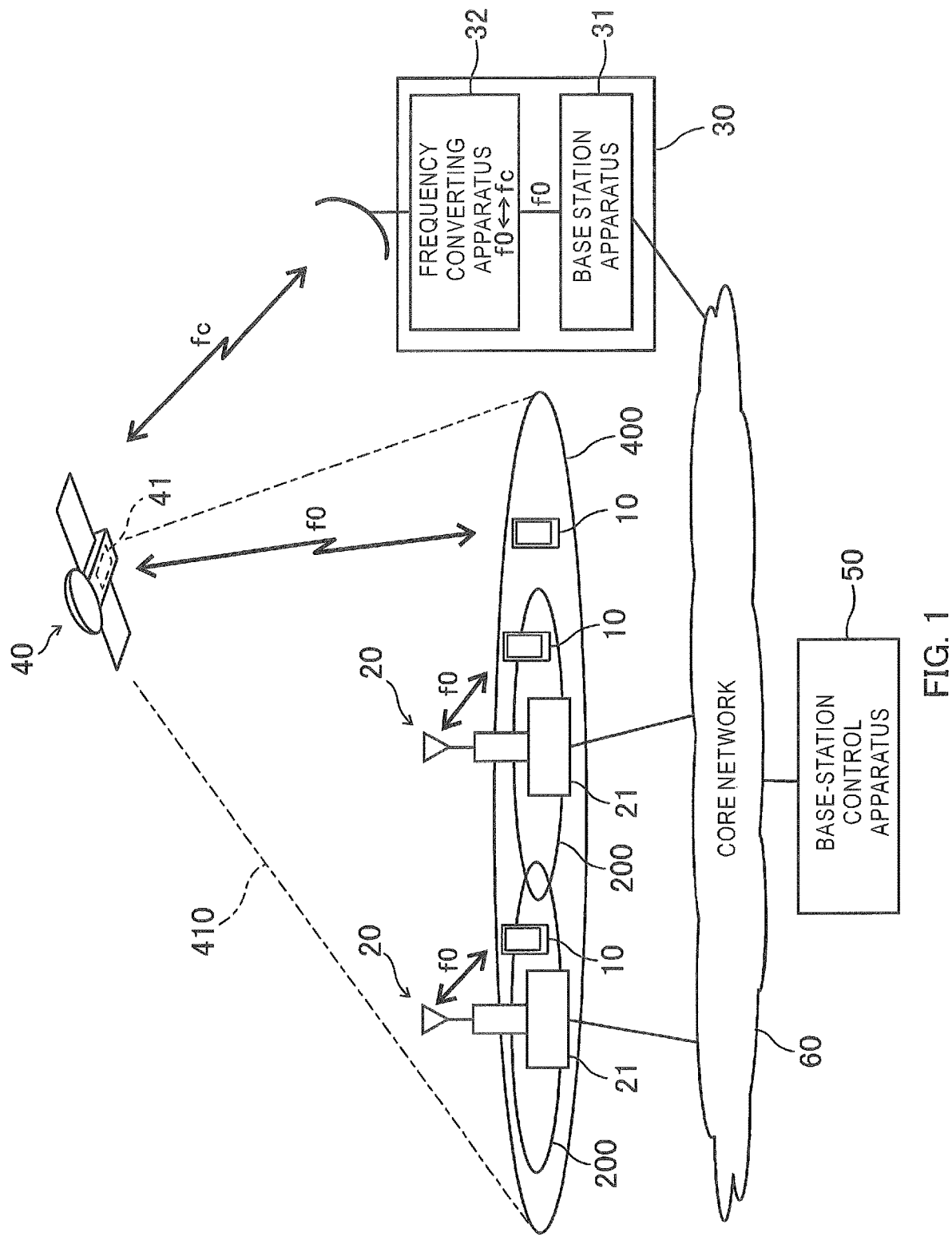
FIG. 1 is an illustration showing an example of an overall configuration of a mobile communication system using a communication terminal apparatus according to an embodiment of the present invention.

FIG. 1 is an illustration showing an example of an overall configuration of a mobile communication system (mobile phone system) using a communication terminal apparatus according to an embodiment of the present invention. The communication terminal apparatus 10 of the present embodiment can use a terrestrial system (terrestrial cellular mobile communication system) via a terrestrial cellular base station and a satellite system (satellite mobile communication system) via an artificial geostationary satellite.

It is noted that, in the present embodiment, a communication operation mode when the communication terminal apparatus 10 communicates by using the terrestrial system is called a "terrestrial communication mode", and a communication operation mode when the communication terminal apparatus 10 is communicates by using the satellite system is called a "satellite communication mode". In the present embodiment, although cases where the artificial satellite used in the satellite mobile communication system is a geostationary satellite (hereinafter called as "artificial geostationary satellite") will be described, an artificial satellite such as a non-geostationary satellites and a quasi-zenith satellite other than the artificial geostationary satellite may be used in the satellite mobile communication system.

In FIG. 1, the mobile communication system of the present embodiment is provided with a base station 20 (hereinafter called as "terrestrial cellular base station") capable of performing a radio communication with the communication terminal apparatus 10 via the terrestrial system, and a satellite base station 30 capable of performing a radio communication with the communication terminal apparatus 10 via a communication relay apparatus 41 of an artificial geostationary satellite 40 as a satellite relay station. A base station apparatus 21 of the terrestrial cellular base station 20, a base station apparatus 31 of the satellite base station 30 and a base-station control apparatus 50 for controlling each of the base stations are respectively connected to a core network 60 via a wired communication line consisting of a leased line, a general-purpose line, etc.

The same radio transmission method and the same frequency band are used for the radio communication between the communication terminal apparatus 10 and each of the terrestrial cellular base station 20 and the communication relay apparatus 41 of the artificial geostationary satellite 40. As a radio transmission method, for example, a communication method of the third generation mobile communication system (3G) such as a WCDMA (registered trademark) (Wideband Code Division Multiple Access) and a CDMA-2000, a communication method of LTE (Long Term Evolution) and LTE-Advanced, a communication method of the fourth generation mobile telephone, etc. can be adopted. Moreover, as a frequency band of radio communication (service link) with the communication terminal apparatus 10, for example, a frequency band of a predetermined band (for example, 30 MHz) in the MSS band (1,980 to 2,010 MHz for uplink and 2,170 to 2,200 MHz for downlink) that is standardized by the IMT (International Mobile Telecommunication)-2000 can be allocated. Furthermore, as a frequency band of radio communication (feeder link) between the communication relay apparatus 41 of the artificial geostationary satellite 40 and the satellite base station 30 on the ground, for example, a frequency band of a predetermined band in the Ku band (14 GHz for uplink and 12 GHz for downlink) can be allocated.

The communication terminal apparatus 10 is a mobile telephone, a smart-phone or a portable personal computer, etc. having a mobile communication function, and is also called as a user equipment (UE), a mobile apparatus, a mobile station apparatus or a portable communication terminal. For example, when the communication terminal apparatus 10 is located in an area where the area (hereinafter called as "terrestrial station area") 200 in which a radio communication can be performed with the terrestrial cellular base station 20 and the area (hereinafter called as "satellite station area") 400 in which a radio communication can be performed with the communication relay apparatus 41 of the artificial geostationary satellite 40 are overlapped, the communication terminal apparatus 10 can use the terrestrial system and the satellite system. It is noted that, in this overlapping area, since strength (received power) of signal received from the terrestrial cellular base station 20 is high, the communication terminal apparatus 10 preferentially uses the terrestrial system. Moreover, when the communication terminal apparatus 10 is located in an area outside the terrestrial station area 200 and within the satellite station area 400, the communication terminal apparatus 10 can use the satellite system.

The terrestrial cellular base station 20 is provided with the base station apparatus 21 and an antenna, etc. and is capable of communicating with the communication terminal apparatus 10 at the frequency f0 within the aforementioned predetermined frequency band by using a predetermined radio transmission method (modulation method). As the terrestrial cellular base station 20, for example, a macro base station for wide area which covers a macro cell being as a normal wide area with a radius from about several hundred meters to several kilometers and a small base station provided to cover a smaller area (for example, pico cell and femto cell) than the area covered by the wide area macro base station can be exemplified. The macro base station may be referred to as "macro-cell base station", "Macro e-Node B", or the like, and the small base station may also be referred to as "small-cell base station", "Micro-cell base station".

The satellite base station 30 is provided with a base station apparatus 31 similar to the base station apparatus 21 of the terrestrial cellular base station 20, a frequency converting apparatus 32, and an antenna, etc. and may also be referred to as "feeder link station". Using the predetermined radio transmission method (modulation method) similar to the terrestrial cellular base station 20, the satellite base station 30 can communicate with the communication relay apparatus 41 of the artificial geostationary satellite 40 by converting the frequency f0 to the frequency fc for the satellite communication. When relaying a communication between the base station apparatus 31 and the communication relay apparatus 41 of the artificial geostationary satellite 40, the frequency converting apparatus 32 functions as frequency converting means for performing a conversion between the frequency f0 used in the base station apparatus 31 and the frequency fc for satellite communication used for communication of the communication relay apparatus 41 of the artificial geostationary satellite 40.

The communication relay apparatus 41 of the artificial geostationary satellite 40 has frequency converting means for performing a non-regenerative frequency conversion relay. When relaying a communication between the communication terminal apparatus 10 and the satellite base station 30, the frequency converting means performs a conversion between the frequency f0 used for communication with the communication terminal apparatus 10 and the frequency fc for satellite communication used for communication with the satellite base station 30. For example, the communication relay apparatus 41 can communicate with the communication terminal apparatus 10 at the frequency f0 by converting the frequency fc of the signal received from the satellite base station 30 to the frequency f0.

The base-station control apparatus 50 may control an allocation of radio resources (frequency, time slot) with respect to the terrestrial cellular base station 20 and the satellite base station 30 corresponding to a common area to which at least a part of areas capable of performing a radio communication with the communication terminal apparatus 10. That is, the base-station control apparatus 50 performs a control to allocate radio resources used in the terrestrial cellular base station 20 and radio resources used in the satellite base station 30 so that they do not overlap with each other. Moreover, in an emergent condition in which a failure occurs in some of the terrestrial cellular base stations 20 due to a disaster or the like, the base-station control apparatus 50 may also control to increase the radio resource (for example, time slot) allocated for the satellite base station 30 so as to be more than that in a normal condition. For example, in an emergent condition in which a failure occurs in some of the terrestrial cellular base stations 20 due to a disaster or the like, the base-station control apparatus 50 controls to increase an allocation rate of radio resources (for example, time slots) allocated to the satellite base station 30 so as to be more than that in a normal condition. These controls may be performed, for example, by transmitting a predetermined control data from the base-station control apparatus 50 to the terrestrial cellular base station 20 and the satellite base station 30. Here, the "allocation rate" of radio resources allocated to the satellite base station 30 is a ratio of radio resources allocated to the satellite base station 30 in radio resources allocated to all of the terrestrial cellular base station 20 and the satellite base station 30 in the common area.

In particular, in the present embodiment, the base-station control apparatus 50 performs a control to allocate time slots of the radio resource used in the terrestrial cellular base station 20 and time slots of the radio resource used in the satellite base station 30 so that they do not overlap with each other. The time slot of radio resource is a time interval obtained by dividing a radio communication frame of a predetermined time length by a predetermined number, and a basic unit of temporal allocation control of the radio resources. For example, when a radio communication frame of the radio resource allocated to all of the terrestrial cellular base station 20 and the satellite base station 30 is divided into 8 or 10, the 8 or 10 time slots in the radio communication frame are allocated so that the time slots do not overlap between the terrestrial cellular base station 20 and the satellite base station 30.

Allocation information on the radio resource (time slot) allocated to each of the terrestrial system and the satellite system is sent from the base-station control apparatus 50 to the terrestrial cellular base station 20 and the satellite base station 30 respectively, and memorized in a memory device of each base station 20 and 30. Each of the terrestrial cellular base station 20 and the satellite base station 30 performs downlink and uplink communications with the communication terminal apparatus 10 based on the allocation information on the radio resource (time slot). The allocation information on the radio resource (time slot) is sent, for example, from the terrestrial cellular base station 20 and the satellite base station 30 to the communication terminal apparatus 10, and memorized in the memory device of the communication terminal apparatus 10. The communication terminal apparatus 10 performs downlink and uplink communications with the terrestrial cellular base station 20 and the satellite base station 30 respectively based on the allocation information on the radio resource (time slot).

The communication terminal apparatus 10 is configured with, for example, hardware such as a computer apparatus having a CPU, a memory, etc., and a radio communication section, and can perform a radio communication with the terrestrial cellular base station 20 and the satellite base station 30, by executing a predetermined program. The terrestrial cellular base station 20 and the satellite base station 30 are configured with, for example, hardware such as a computer apparatus having a CPU, a memory, etc., an external communication interface section for the core network 60, and a radio communication section, and can perform a radio communication with the communication terminal apparatus 10 and a communication with the core network 60 side, by executing a predetermined program. The base-station control apparatus 50 is configured with, for example, hardware such as a computer apparatus having a CPU, a memory, etc., an external communication interface section for the core network 60, and can perform a control of the terrestrial cellular base station 20 and the satellite base station 30, by executing a predetermined program.

The communication terminal apparatus 10, the terrestrial cellular base station 20 and the satellite base station 30 in the present embodiment are timely synchronized with each other with a predetermined time accuracy (for example, 1 µs or less) so as to comply with the foregoing allocation control of the time slots of radio resource. This time synchronization may be performed, for example, by accessing a predetermined time server or receiving a signal from a GPS satellite.

Figure 2:
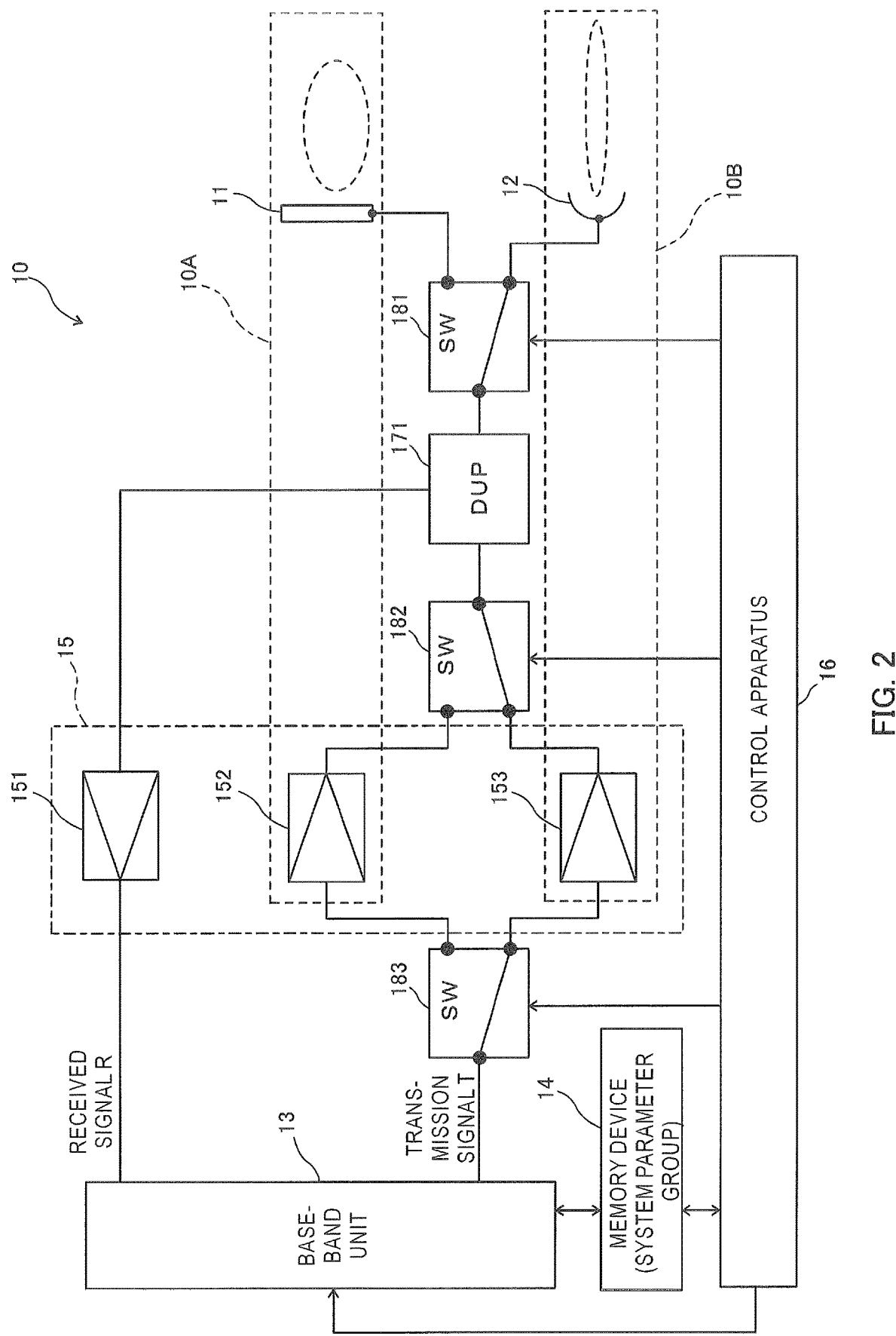
FIG. 2 is a block diagram showing a configuration example of a communication terminal apparatus according to the present embodiment.

FIG. 2 is a block diagram showing a configuration example of the communication terminal apparatus 10 according to the present embodiment. It is noted that, the configuration of the communication terminal apparatus 10 is not limited to the configuration of FIG. 2, however, may be any configuration as long as it can be used in the terrestrial system and the satellite system and can comply with an allocation control of time slots of the radio resource in the terrestrial system and the satellite system.

In FIG. 2, the communication terminal apparatus 10 is provided with a first antenna 11 used for a radio communication with the terrestrial cellular base station 20 in the terrestrial system, a second antenna 12 used for a radio communication with the artificial geostationary satellite 40 in the satellite system, and an antenna changeover switch (sw) 181 as antenna switching means. The first antenna 11 is, for example, a linear antenna corresponding to a vertically polarized wave of the terrestrial system, and the second antenna 12 is a helical antenna or a patch antenna corresponding to a circular polarized wave of the satellite system. The antenna changeover switch 181 switches between the first antenna 11 and the second antenna 12 depending on the selected terrestrial system or satellite system.

Furthermore, the communication terminal apparatus 10 is provided with a baseband unit 13 as shared baseband processing means, and a memory device 14 as memory means for memorizing a system parameter group used for the baseband unit 13. The baseband unit 13 performs a process of a downlink received signal R and an uplink transmission signal T based on the system parameter group consisting of a preset value for each of multiple types of system parameters that are commonly defined for the terrestrial system and the satellite system.

The baseband unit 13 performs a process of generating the uplink transmission signal T by modulating a transmission data of a predetermined time slot, and acquiring a data by demodulating the downlink received signal R of a predetermined time slot, based on a predetermined radio transmission method (for example, a radio transmission method specified by the 3GPP LTE or LTE-Advanced). For this processing in the baseband unit 13, the first system parameter group optimized for the terrestrial system or the second system parameter group optimized for the satellite system is used.

The memory device 14 memories the first system parameter group optimized for the terrestrial system and the second system parameter group optimized for the satellite system as a system parameter group used for the baseband unit 13. The multiple types of system parameters are, for example, a modulation method, a code rate of error correction code, a maximum number of retransmissions during a retransmission control, and transceiving buffer amount for accumulating a transceiving data. Moreover, the memory device 14 memories the aforementioned allocation information on the radio resources (time slots) allocated to the terrestrial system and the satellite system respectively.

Moreover, the communication terminal apparatus 10 is provided with power amplification means 15 for amplifying power of the received signal R to be input to the baseband unit 13 and the transmission signal T outputted from the baseband unit 13 respectively. The power amplification means 15 of the present configuration example is provided with a shared low noise reception power amplifier (hereinafter called as "reception power amplifier") 151 used for power amplification of the received signal R of the terrestrial system and the satellite system respectively, a first transmission power amplifier 152 used for power amplification of the transmission signal T of the terrestrial system, and a second transmission power amplifier 153 used for power amplification of the transmission signal T of the satellite system. The first transmission power amplifier 152 amplifies the power of the transmission signal T of the terrestrial system so that the transmission power becomes, for example, 0.2 [W]. The second transmission power amplifier 153 amplifies the power of the transmission signal T of the satellite system so that the transmission power becomes, for example, 1 [W].

In the configuration example of FIG. 2, the first antenna 11 and the first transmission power amplifier 152 are components 10A dedicated to the terrestrial system, and the second antenna 12 and the second transmission power amplifier 153 are components 10B dedicated to the satellite system.

The path of received signal R received by the antennas 11 and 12 and the path of transmission signal T to the antennas 11 and 12 are separated by the DUP (Duplexer) 171. Moreover, the path of the transmission signal T passing through the first transmission power amplifier 152 and the path of the transmission signal T passing through the second transmission power amplifier 153 are switched by the transmission path changeover switches (SW) 182 and 183.

Moreover, the communication terminal apparatus 10 is provided with a selection means for selecting any one of the terrestrial system or the satellite system, and a control apparatus 16 as control means for controlling to use the first system parameter group or the second system parameter group memorized in the memory device 14 for the baseband unit 13 according to the terrestrial system or the satellite system selected by the selection means. The control apparatus 16 is configured with, for example, CPU, and memory such as a RAM, a ROM, etc., and functions as the control means, by loading and executing a predetermined control program. The control apparatus 16 according to the present embodiment also functions as selection means for selecting any one of the terrestrial system or the satellite system based on a base station identifier included in the common control signal described below and the received power.

It is noted that, the communication terminal apparatus 10 may be provided with a display section such as a liquid crystal panel having a touch panel function connected to the control apparatus 16, and an operation section such as an operation button. In this case, the display section or the operation section may be used as selection means so that a user can arbitrarily select any one of the terrestrial system and the satellite system.

In the communication terminal apparatus 10 of the configuration example of FIG. 2, when the terrestrial system is selected, the received signal R of the predetermined time slot of the downlink from the terrestrial cellular base station 20 received by the first antenna 11 is amplified with the reception power amplifier 151, and then the received signal R is processed to obtain the original data based on the first system parameter group in the baseband unit 13. Moreover, in the baseband unit 13, the transmission signal T of the predetermined time slot of the uplink generated from a transmission-target data based on the first system parameter group is amplified to predetermined power (for example, 0.2 [W]) by the first transmission power amplifier 152 for the terrestrial system, and then the transmission signal T is transmitted from the first antenna 11 to the terrestrial cellular base station 20 by the predetermined time slot.

On the other hand, when the satellite system is selected, the received signal R of the predetermined time slot of the downlink from the artificial geostationary satellite 40 received by the second antenna 12 is amplified with the reception power amplifier 151, and then the received signal R is processed to obtain the original data based on the second system parameter group in the baseband unit 13. Moreover, in the baseband unit 13, the transmission signal T of the predetermined time slot of the uplink generated from the transmission-target data based on the second system parameter group is amplified to predetermined power (for example, 0.1 [W]) by the second transmission power amplifier 153 for the satellite system, and then the transmission signal T is transmitted from the second antenna 12 to the artificial geostationary satellite 40 by the predetermined time slot.

As described above, in the communication terminal apparatus 10 of the configuration example of FIG. 2, since the dedicated antennas 11 and 12 are used and the optimized first or second system parameter groups can be used in the baseband unit 13 according to the mobile communication system selected from the terrestrial system and the satellite system, it is capable of performing the radio communication corresponding to the radio transmission environment of the selected mobile communication system. Moreover, by switching the antennas 11 and 12 and the system parameter groups, the terrestrial system and the satellite system can be easily switched. Further, since the baseband unit 13 for processing the received signal R and the transmission signal T based on the system parameter groups can be shared in the terrestrial system and the satellite system, it is possible to have a simple configuration as compared with a configuration in which a dedicated baseband unit is provided for each of the terrestrial system and the satellite system.

Especially, in the communication terminal apparatus 10 of the configuration example of FIG. 2, since the dedicated transmission power amplifier 152 and 153 can be used according to the mobile communication system selected from the terrestrial system and the satellite system, it is capable of amplifying the power of transmission signal T corresponding to the radio transmission environment of the selected mobile communication system without adjusting the gain of the amplifier, and the optimal power amplifier with low power consumption can be used in consideration of power efficiency. Moreover, since the reception power amplifier 151 can be shared in both of the terrestrial system and the satellite system, a simpler configuration can be achieved.

Figure 3:
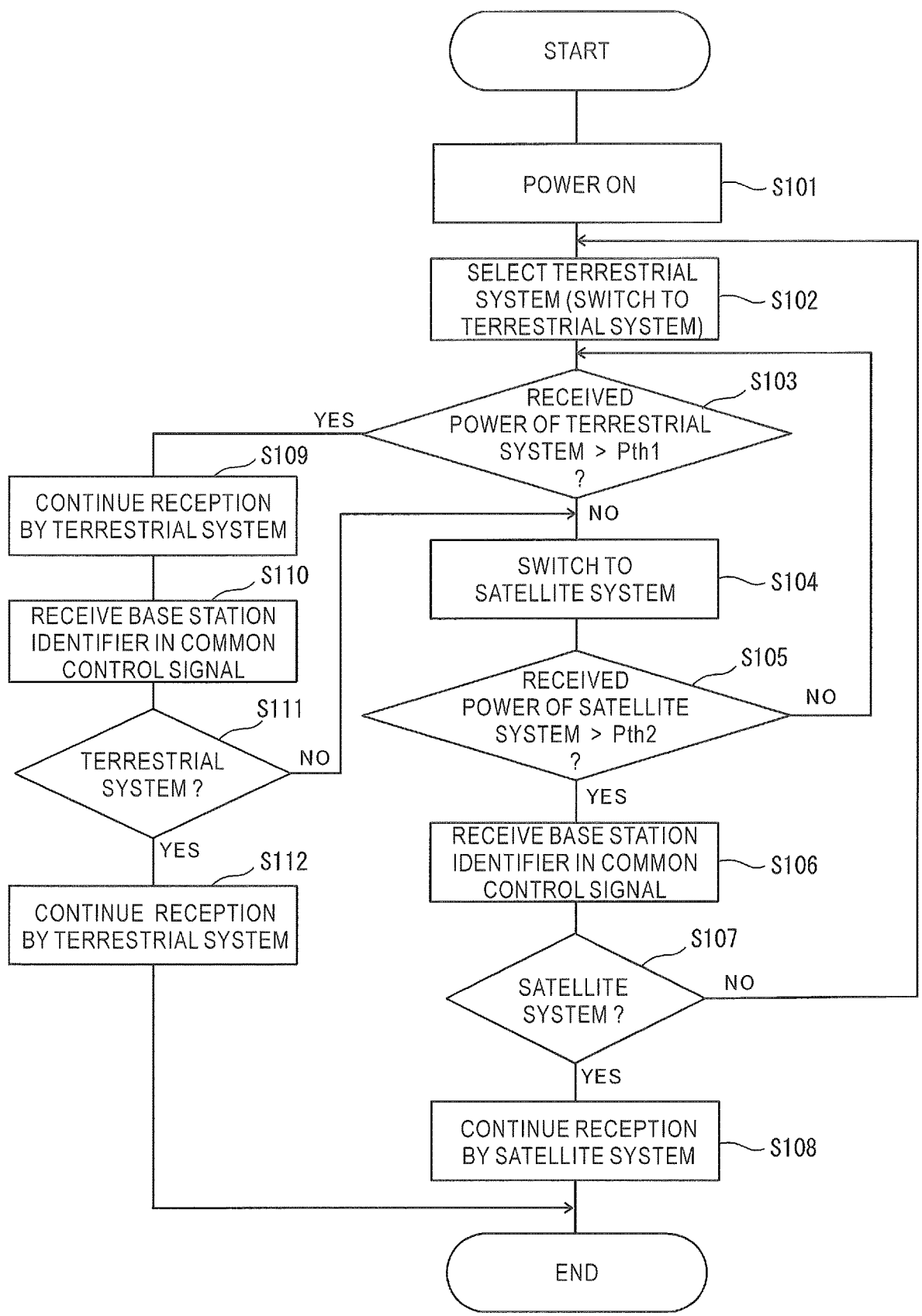
FIG. 3 is a flowchart showing an example of a selection/switching process of a terrestrial system and a satellite system in a communication terminal apparatus according to the present embodiment.

FIG. 3 is a flowchart showing an example of the selection/switching process of the terrestrial system and the satellite system in the communication terminal apparatus according to the present embodiment. In FIG. 3, when the communication terminal apparatus 10 is powered on (S101), the terrestrial system is selected (S102) and it is switched to the antenna 11 and the first system parameter group for the terrestrial system. Next, it is determined whether or not the power (received power) of the received signal received from the terrestrial cellular base station 20 of the terrestrial system is larger than a predetermined first threshold value Pth1 (S103). When the received power of the terrestrial system is smaller than or equal to the first threshold value Pth1 (NO in S103), the terrestrial system is switched to the satellite system (S104), and it is switched to the antenna 12 and the second system parameter group for the satellite system.

Next, it is determined whether or not the received power received from the artificial geostationary satellite 40 of the satellite system is larger than a predetermined second threshold value Pth2 (S105). When the received power of the satellite system is larger than the second threshold value Pth2 (YES in S105), a base station identifier in the common control signal included in the received signal is received (S106), and it is determined whether or not the received signal is the received signal of the satellite system based on the base station identifier (S107). Herein, when it is determined that the received signal is the received signal of the satellite system (YES in S107), the reception by the satellite system is continued (S108). On the other hand, when it is determined that the received signal is not the received signal of the satellite system (NO in S107), it is switched to the terrestrial system (S102).

In the step S103, when the received power of the terrestrial system is larger than the first threshold value Pth1 (YES in S103), the reception by the terrestrial system is continued (S109). Next, the base station identifier in the common control signal included in the received signal is received (S110), it is determined whether or not the received signal is the received signal of the terrestrial system based on the base station identifier (S111). Herein, when it is determined that the received signal is the received signal of the terrestrial system (YES in S111), the reception by the terrestrial system is continued (S112). On the other hand, when it is determined that the received signal is not the received signal of the terrestrial system (NO in S111), it is switched to the satellite system (S104).

According to the selection/switching process of the terrestrial system and the satellite system in FIG. 3, the terrestrial system with more stable radio transmission environment in the normal condition can be used preferentially, and it is capable of automatically switching to the satellite system when the received signal from the terrestrial system become weak for some reason.

It is noted that, in the selection/switching process of the terrestrial system and the satellite system in FIG. 3, in the step S103, it is determined whether or not the received power received from the terrestrial cellular base station 20 of the terrestrial system is larger than the first threshold value Pth1, however, it may be determined whether or not the received power is equal to or larger than the first threshold value Pth1. Moreover, in the step S105, it is determined whether or not the received power received from the artificial geostationary satellite 40 of the satellite system is larger than the second threshold value Pth2, however, it may be determined whether or not the received power is equal to or larger than the second threshold value Pth2.

The satellite system of the present embodiment is an example of a case where the artificial geostationary satellite 40 has a single beam antenna configuration. The satellite station area 400 where the communication relay apparatus 41 of the artificial geostationary satellite 40 can communicate with the communication terminal apparatus 10 is a single beam area corresponding to the beam 410 indicating the orientated direction of the antenna of the communication relay apparatus 41. It is noted that, in the satellite system, the artificial geostationary satellite 40 may have a multi-beam antenna configuration. In this case, the satellite station area 400 where the communication relay apparatus 41 of the artificial geostationary satellite 40 can communicate with the communication terminal apparatus 10 becomes a plurality of beam areas, which are spatially offset from each other, corresponding to the beams indicating a plurality of mutually different oriented directions of the antenna of the communication relay apparatus 41.

As a result of an experiments and studies, which are conducted by the inventors of the present application, on the mobile communication system including the terrestrial system and the satellite system of the above-described configuration, it was found that the interference between the terrestrial system and the satellite system is different between the case of performing a downlink radio communication and the case of performing an uplink radio communication.

Figure 4A:
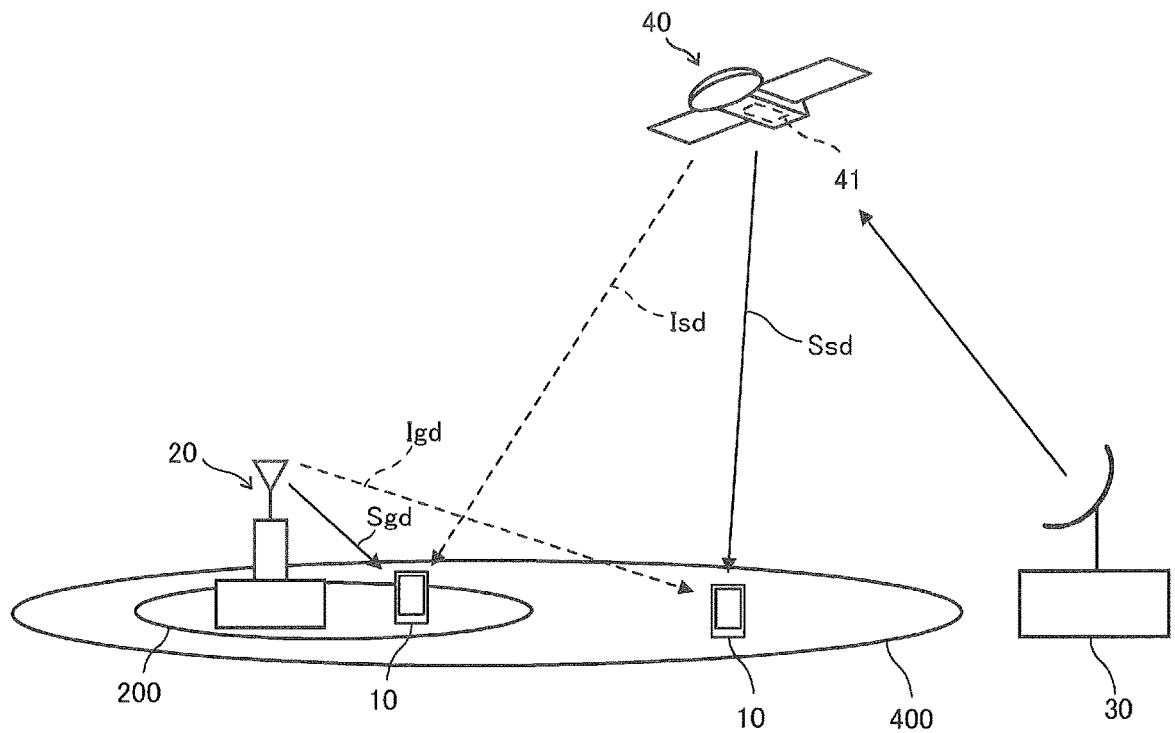
FIG. 4A is an illustration showing a state of interference from a satellite system to a terrestrial system when a communication terminal apparatus performs a downlink communication.
Figure 4B:
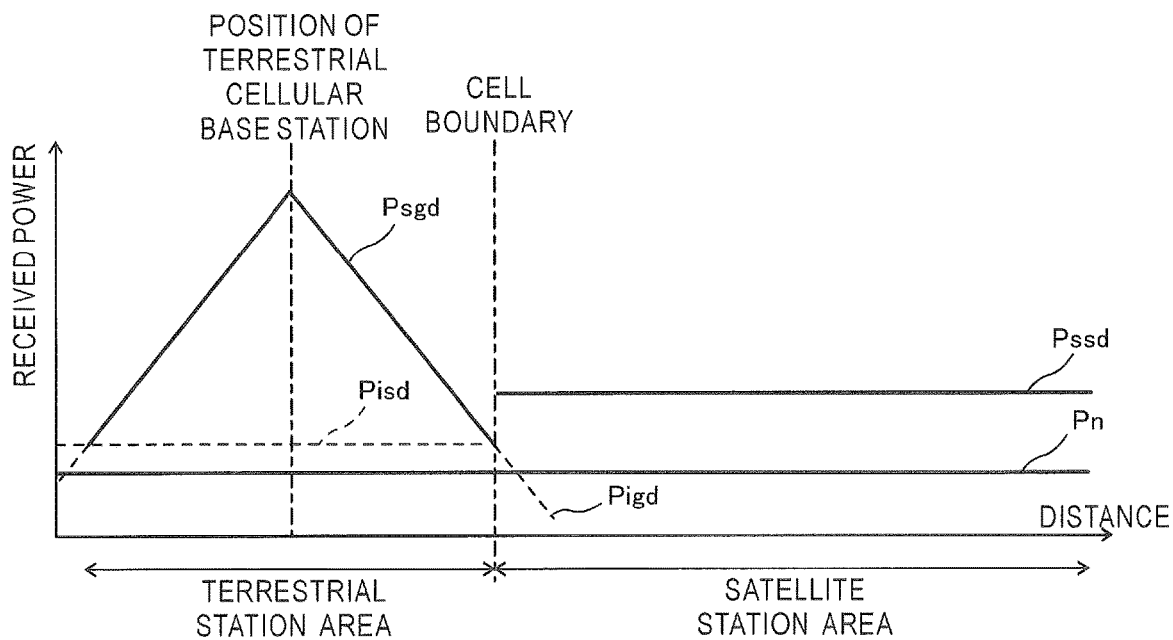
FIG. 4B is a graph showing an example of change of a received power from a terrestrial system and a satellite system respectively with respect to the position of the communication terminal apparatus in FIG. 4A.

FIG. 4A is an illustration showing a state of interference from the satellite system to the terrestrial system when the communication terminal apparatus 10 performs a downlink communication, and FIG. 4B is a graph showing an example of change in the received power from the terrestrial system and the satellite system respectively with respect to the position of the communication terminal apparatus 10 of FIG. 4A. Sgd and Psgd in the figure indicate a terrestrial desired wave from the terrestrial cellular base station 20 to the communication terminal apparatus 10 in the terrestrial communication mode in the terrestrial station area 200 and its received power respectively, and Igd and Pigd indicate a terrestrial interference wave from the terrestrial cellular base station 20 to the communication terminal apparatus 10 of the satellite communication mode in the satellite station area 400 and its received power respectively. Moreover, Ssd and Pssd in the figure indicate a satellite desired wave from the communication relay apparatus 41 of the artificial geostationary satellite 40 to the communication terminal apparatus 10 of the satellite communication mode in the satellite station area 400 and its received power respectively, and Isd and Pisd indicate a satellite interference wave from the communication relay apparatus 41 to the communication terminal apparatus 10 of the terrestrial communication mode in the terrestrial station area 200 and its received power respectively.

In FIG. 4, propagation loss between the communication relay apparatus 41 of the artificial geostationary satellite 40 and the communication terminal apparatus 10 is much larger than propagation loss between the terrestrial cellular base station 20 and the communication terminal apparatus 10 (for example, 50 dB or more larger). Accordingly, in the terrestrial station area 200, the received power Pis of the satellite interference wave Is received from the communication relay apparatus 41 of the artificial geostationary satellite 40 is extremely small. For example, the received power Pis of the satellite interference wave Is from the communication relay apparatus 41 of the artificial geostationary satellite 40 is slightly larger than a thermal noise power Pn. Therefore, even when time slots of the radio resources allocated to the satellite system are used on the downlink from the terrestrial system in the terrestrial station area 200, the reception quality (for example, SINR: desired signal power (thermal noise power Pn+interference signal power Pisd) ratio) of the downlink is slightly deteriorated.

Figure 5:
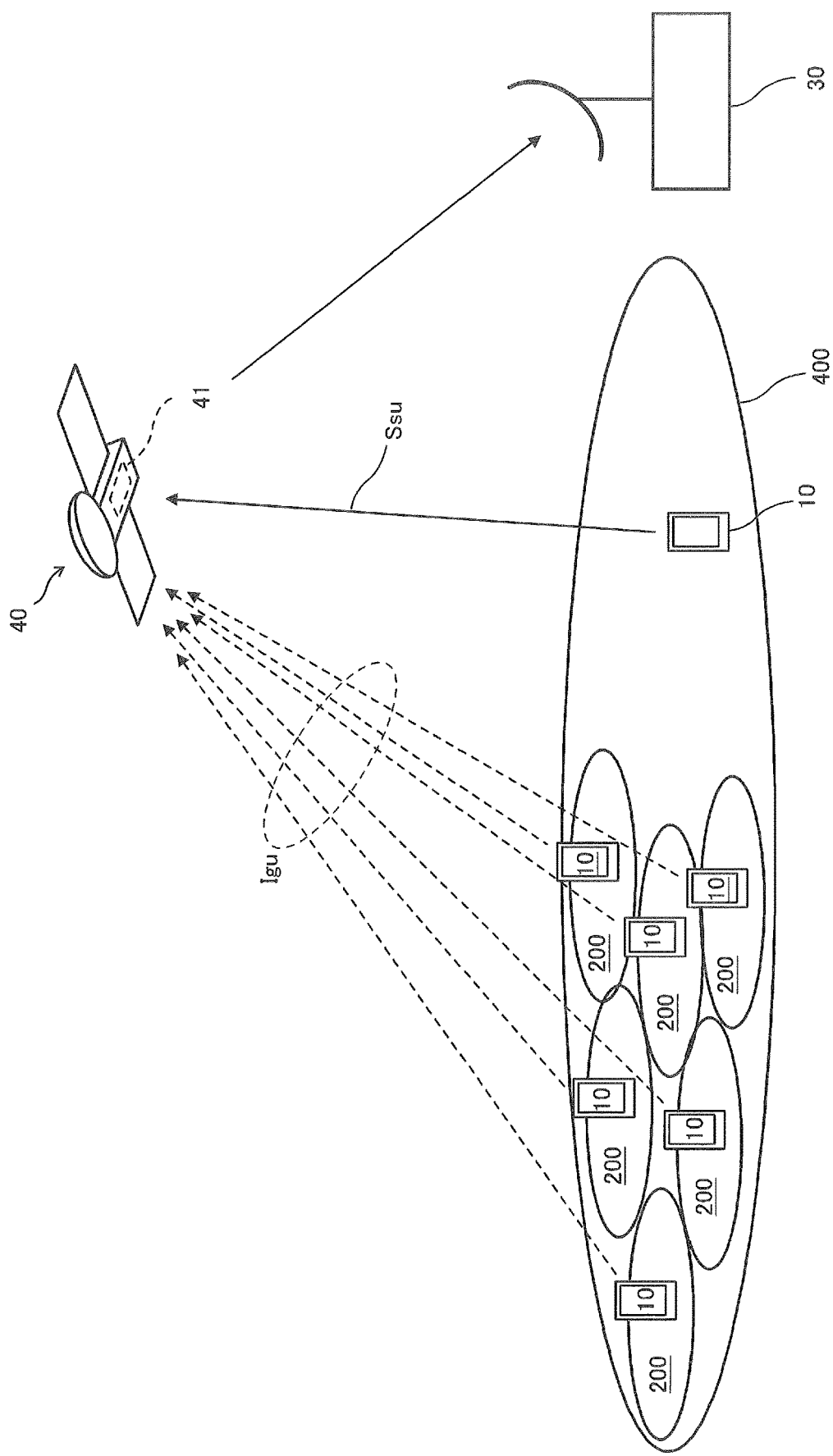
FIG. 5 is an illustration showing a state of interference from a terrestrial system to a satellite system when a communication terminal apparatus performs an uplink communication.

FIG. 5 is an illustration showing a state of interference from the terrestrial system to the satellite system when the communication terminal apparatus 10 performs an uplink communication. Ssu in the figure is a uplink satellite desired wave from the communication terminal apparatus 10 of the satellite communication mode to the communication relay apparatus 41 of the artificial geostationary satellite 40, and Igu is an uplink terrestrial interference wave from the communication terminal apparatus 10 in the terrestrial station area 200 to the communication relay apparatus 41 of the artificial geostationary satellite 40.

In FIG. 5, the number of the communication terminal apparatuses 10, which are in the terrestrial communication mode and simultaneously communicate using the terrestrial system, corresponds to the number of the terrestrial cellular base station 20 existing in the satellite station area 400. The uplink interference power from the terrestrial system received by the communication relay apparatus 41 of the artificial geostationary satellite 40 is the sum of the power of the terrestrial interference wave Igu from a plurality of the communication terminal apparatus 10 simultaneously using the terrestrial system. Accordingly, the uplink interference power received from the communication relay apparatus 41 becomes a much larger value than the electric power of the uplink satellite desired wave Ssu from the communication terminal apparatus 10 using the satellite system, and the uplink reception quality (for example, SINR: desired signal power Pssu pair (thermal noise power Pn+interference signal power Pigu) ratio) greatly deteriorates, so the uplink communication of the satellite system can not be performed. Accordingly, in the uplink, the same time slot cannot be used for the terrestrial system and the satellite system.

Therefore, in the present embodiment, when the communication terminal apparatus 10 is located in the terrestrial station area 200 of the terrestrial system, all of the time slots allocated to the terrestrial system and at least a part of the time slots allocated to the satellite system are used in the downlink to the communication terminal apparatus 10, and all of the time slots allocated to the terrestrial system are used so as not to use the time slots allocated to the satellite system in the uplink from the communication terminal apparatus 10.

Figure 6:
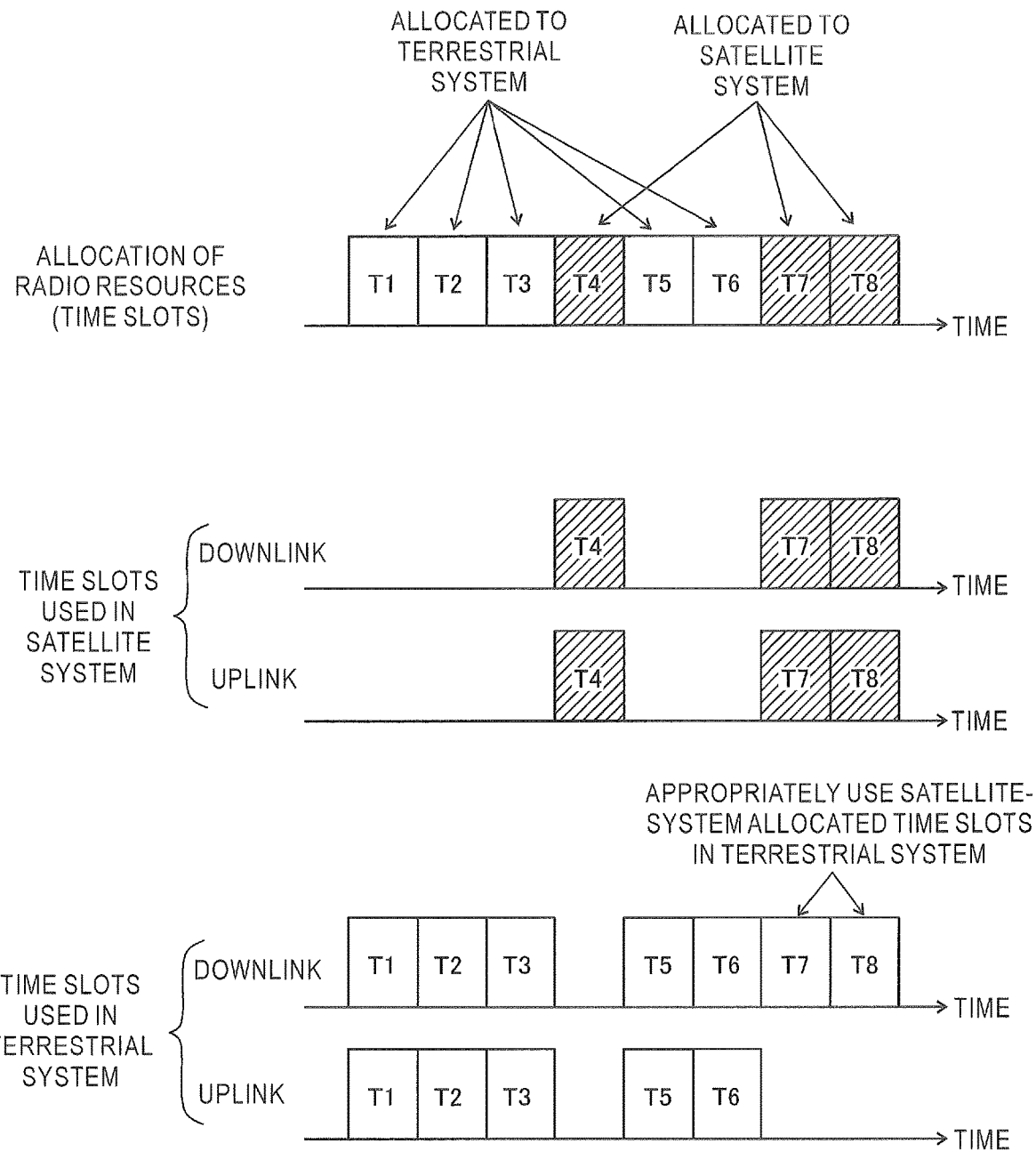
FIG. 6 is an illustration showing an example of time-slot allocation and proper use of the allocated time slots in downlink and uplink according to the mobile communication system of the present embodiment.

FIG. 6 is an illustration showing an example of time-slot allocation and proper use of the allocated time slot in downlink and uplink according to the mobile communication system of the present embodiment. It is noted that, in the example of FIG. 6 and the example of FIG. 7 described below respectively, although the case where the number of time slots allocated by time division of the radio frame is 8 is illustrated, the number of division of the radio frame (number of time slots per radio frame) may be equal to 7 or less, or equal to 9 or more. Moreover, in an example shown in the figure, although time slots T1 to T3, T5 and T6 are allocated to the terrestrial system and other time slots T4, T7 and T8 are allocated to the satellite system, the allocation of the time slots is not limited to the illustrated example.

In FIG. 6, in downlink and uplink radio communication between the satellite base station 30 of the satellite system and the communication terminal apparatus 10, time slots T4, T7 and T8 allocated to the satellite system are used. Moreover, in the uplink radio communication from the communication terminal apparatus 10 of the terrestrial system to the terrestrial cellular base station 20, time slots T1 to T3, T5 and T6 allocated to the terrestrial system are used. On the contrary, in the downlink radio communication from the terrestrial cellular base station 20 of the terrestrial system to the communication terminal apparatus 10, all of the time slots T1 to T3, T5 and T6 allocated to the terrestrial system and a part of the time slots T4, T7 and T8 (in the illustrated example, time slots T7 and T8) allocated to the satellite system are used. As a result, it is possible to improve the spectral efficiency (throughput) of the downlink of the terrestrial system having a large traffic amount.

It is noted that, in the downlink radio communication of the terrestrial system of FIG. 6, it may be controlled so as to use a part of the time slots allocated to the satellite system, depending on the traffic amount of the downlink. For example, when the downlink traffic amount is small, it may be controlled to use the time slots T1 to T3, T5 and T6 allocated to the terrestrial system without using time slots allocated to the satellite system, and when the downlink traffic amount increases, it may be controlled to further use a part of the time slots T4, T7 and T8 allocated to the satellite system.

As mentioned above, by separately using in the downlink and the uplink of the time slot when using the terrestrial system shown in FIG. 6, in the down link of the terrestrial station area 200 of the terrestrial system, not only all of the time slots T1 to T3, T5 and T6 allocated to the terrestrial system but also a part of the time slots T4, T7 and T8 allocated to the satellite system are used. Accordingly, it is possible to improve the spectral efficiency of the downlink in the terrestrial system. Moreover, in the downlink in the terrestrial station area 200, since the strength of the signal from the satellite system is much weaker than that of the signal from the terrestrial system, even when the time slots allocated to the satellite system is used, the influence of interference from the satellite system can be reduced to a negligible level.

On the other hand, in the uplink in the terrestrial station area 200, all of the time slots T1 to T3, T5 and T6 allocated to the terrestrial system are used, and the time slots T4, T7 and T8 allocated to the satellite system are not used. Accordingly, it is possible to avoid that the signal of the uplink of the terrestrial system interferes with the signal of the uplink of the satellite system.

Moreover, since the radio resources of the satellite system, which are controlled to be switched between the uplink and the downlink in the terrestrial station area 200 are time slots that are easy to be controlled, the switching control of the radio resources is easy compared with the case of controlling to switch frequencies.

Figure 7:
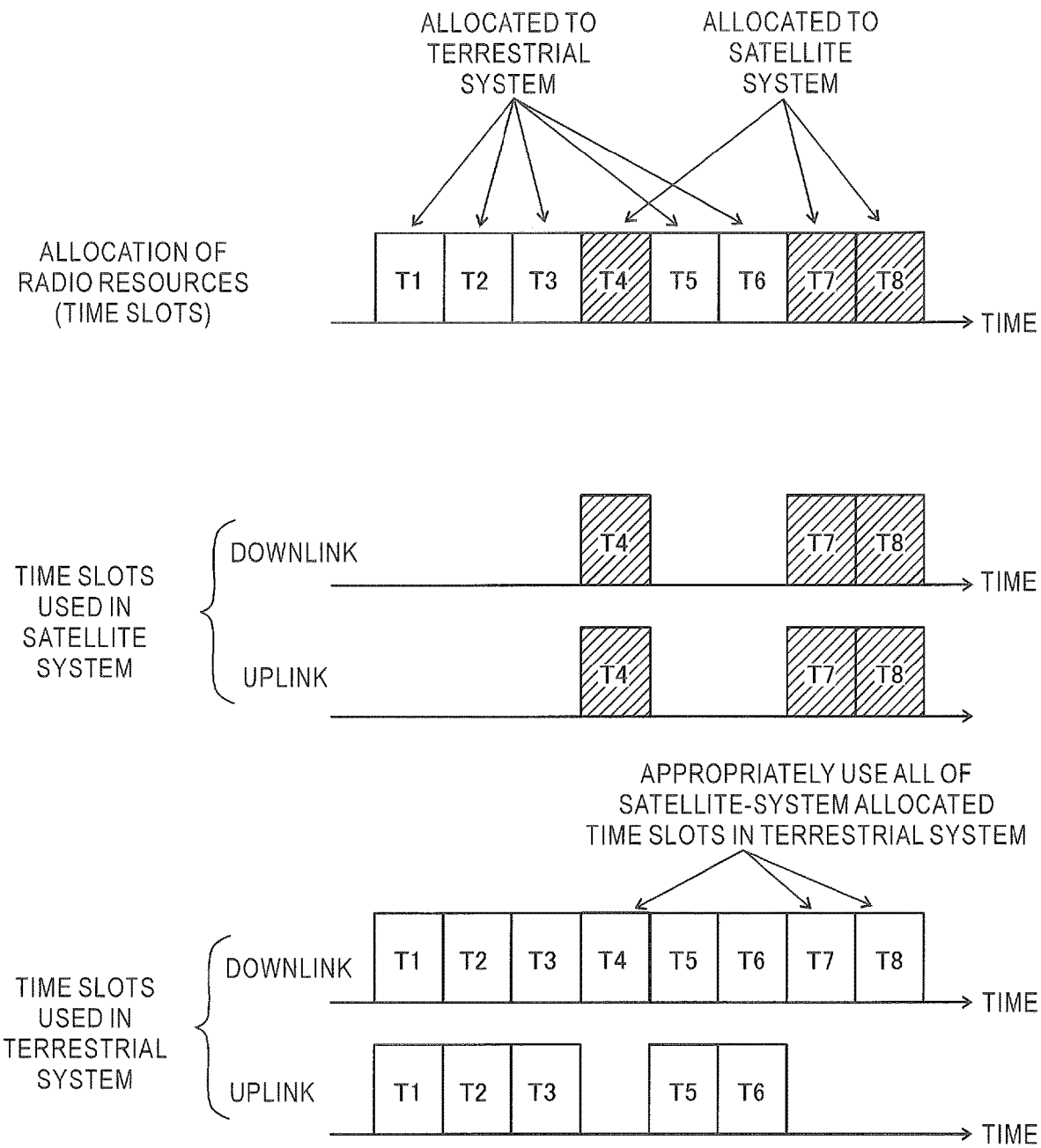
FIG. 7 is an illustration showing another example of time-slot allocation and proper use of the allocated time slots in downlink and uplink according to the mobile communication system of the present embodiment.

FIG. 7 is an illustration showing another example of time slot allocation and proper use of the allocated time slot in downlink and uplink according to the mobile communication system of the present embodiment. In FIG. 7, in downlink and uplink radio communications between the satellite base station 30 of the satellite system and the communication terminal apparatus 10, all of the time slots T4, T7 and T8 allocated to the satellite system are used. Moreover, in the uplink radio communication from the communication terminal apparatus 10 of the terrestrial system to the terrestrial cellular base station 20, all of the time slots T1 to T3, T5 and T6 allocated to the terrestrial system are used. On the contrary, in the downlink radio communication from the terrestrial cellular base station 20 of the terrestrial system to the communication terminal apparatus 10, all of the time slots T1 to T3, T5 and T6 allocated to the terrestrial system and all of the time slots T4, T7 and T8 allocated to the satellite system are used. Accordingly, it is possible to improve the spectral efficiency (throughput) of the downlink of the terrestrial system having a large traffic amount.

It is noted that, in the downlink radio communication of the terrestrial system of FIG. 7, it may be controlled so as to use the time slots allocated to the satellite system, depending on the traffic amount of the downlink. For example, when the downlink traffic amount is small, it may be controlled to use the time slots T1 to T3, T5 and T6 allocated to the terrestrial system without using time slots allocated to the satellite system, and when the downlink traffic amount increases, it may be controlled to further use all of the time slots T4, T7 and T8 allocated to the satellite system.

As mentioned above, by separately using in the downlink and the uplink of the time slot shown in FIG. 7, in the downlink of the terrestrial station area 200 of the terrestrial system, not only all of the time slots T1 to T3, T5 and T6 allocated to the terrestrial system but also all of the time slots T4, T7 and T8 allocated to the satellite system are used. Accordingly, it is possible to improve the spectral efficiency (throughput) of the downlink in the terrestrial system.

Moreover, as in the example of FIG. 6, even when the time slots allocated to the satellite system is used, the influence of interference from the satellite system can be reduced to a negligible level, and it is possible to avoid that the uplink signal of the terrestrial system interferes with the uplink signal of the satellite system, and the switching control of the radio resources is easy compared with the case of controlling to switch frequencies.

Especially in the example of FIG. 7, in the downlink of the terrestrial system area, by using all of the time slots T4, T7 and T8 allocated to the satellite system, it is possible to further increase the spectral efficiency (throughput) in the downlink of the terrestrial system.

As described above, according to the present embodiment, it is possible to share the communication terminal apparatus 10 for the terrestrial system and the satellite system, and it is possible to improve the spectral efficiency (throughput) of the downlink in the terrestrial system while avoiding an interference between both systems by simple switching control of radio resources.

It is noted that, the process steps and configuration elements in the mobile communication system, the base station, the communication terminal apparatus (user terminal equipment, mobile station) and the components of the router device described in the present specification can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, communication terminal apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 communication terminal apparatus
20 terrestrial cellular base station
30 satellite base station
40 artificial geostationary satellite
41 communication relay apparatus
50 base-station control apparatus
60 core network
200 terrestrial station area
400 satellite station area
410 beam

The invention claimed is:

1. A communication terminal apparatus shared in a terrestrial cellular mobile communication system and a satellite mobile communication system, comprising:
   memory means for memorizing allocation information on time slots of radio resources allocated to the terrestrial cellular mobile communication system and the satellite mobile communication system in which a same frequency band is used, so as not to overlap with each other on a time axis between the systems;
   transceiving means for performing a radio communication of each of downlink and uplink in the same frequency band by selecting one of a terrestrial cellular mobile communication method and a satellite mobile communication method according to an area in which the communication terminal apparatus is located; and
   control means for controlling the transceiving means to switch the time slots used between a downlink and an uplink based on the allocation information on the time slots of radio resources, when the communication terminal apparatus is located in an area of the terrestrial cellular mobile communication system, so as to use all of time slots allocated to the terrestrial cellular mobile communication system and at least a part of time slots allocated to the satellite mobile communication system in a downlink of the same frequency band to the communication terminal apparatus, and so as to use all of time slots allocated to the terrestrial cellular mobile communication system and none of time slots allocated to the satellite mobile communication system in an uplink of the same frequency band from the communication terminal apparatus.

2. The communication terminal apparatus according to claim 1,
wherein the control means controls to use all of the time slots allocated to the terrestrial cellular mobile communication system and all of the time slots allocated to the satellite mobile communication system in downlink to the communication terminal apparatus when the communication terminal apparatus is located in the area of the terrestrial cellular mobile communication system.

3. The communication terminal apparatus according to claim 1,
wherein the control means controls so as to change the number of time slots allocated to the satellite mobile communication system, the time slots being used in the downlink to the communication terminal apparatus in the area of the terrestrial cellular mobile communication system, according to a traffic amount of the downlink in the area of the terrestrial cellular mobile communication system.

4. A terrestrial cellular base station capable of communicating with a communication terminal apparatus in a mobile communication system including terrestrial cellular mobile communication system and satellite mobile communication system, and
wherein the terrestrial cellular base station comprises:
memory means for memorizing allocation information on time slots of radio resources allocated to the terrestrial cellular mobile communication system and the satellite mobile communication system in which a same frequency band is used, so as not to overlap with each other on a time axis between the systems;
transceiving means for performing a radio communication of each of downlink and uplink in the same frequency band with a communication terminal apparatus located in an area of an own base station by terrestrial cellular mobile communication method; and
control means for controlling the transceiving means to switch the time slots used between a downlink and an uplink, based on the allocation information on the time slots of radio resources,
so as to use all of time slots allocated to the terrestrial cellular mobile communication system and at least a part of time slots allocated to the satellite mobile communication system in a downlink of the same frequency band to the communication terminal apparatus located in the area of the own station, and
so as to use all of time slots allocated to the terrestrial cellular mobile communication system and none of time slots allocated to the satellite mobile communication system in an uplink of the same frequency band from the communication terminal apparatus located in the area of the own station.

5. The terrestrial cellular base station according to claim 4,
wherein the control means controls to use all of the time slots allocated to the terrestrial cellular mobile communication system and all of the time slots allocated to the satellite mobile communication system in the downlink to the communication terminal apparatus located in the area of the own base station.

6. The terrestrial cellular base station according to claim 4,
wherein the control means controls so as to change the number of time slots allocated to the satellite mobile communication system, the time slots being used in the downlink to the communication terminal apparatus in the area of the own station, according to traffic amount of the downlink to the communication terminal apparatus in the area of the own station.

7. A mobile communication system including a terrestrial cellular mobile communication system and a satellite mobile communication system, comprising:
a terrestrial cellular base station capable of performing a radio communication with a communication terminal apparatus;
a satellite base station capable of performing a radio communication with a communication terminal apparatus via a communication relay apparatus of an artificial satellite; and
a base-station control apparatus that controls the terrestrial cellular base station and the satellite base station,
wherein the terrestrial cellular base station is the terrestrial cellular base station according to claim 4.

8. For a communication terminal apparatus shared in a terrestrial cellular mobile communication system and a satellite mobile communication system, wherein a same frequency band is used for uplink and downlink radio communications with the communication terminal apparatus for the terrestrial cellular mobile communication system and for uplink and downlink radio communications with the communication terminal apparatus for the satellite mobile communication system, a method comprising:
allocating a first subset of a plurality of time slots of radio resources for the same frequency band to the terrestrial cellular mobile communication system for uplink;
allocating a second subset of the plurality of time slots to the satellite mobile communication system, wherein the first subset and the second subset do not overlap;
determining that the communication terminal apparatus is located within an area of the terrestrial cellular mobile communication system; and
based on the determination that the communication terminal apparatus is located within an area of the terrestrial cellular mobile communication:
using all of the plurality of time slots of the first subset and at least a part of the plurality of time slots of the second subset for downlink radio communications to the communication terminal apparatus; and
using all of the plurality of time slots of the first subset and none of the plurality of time slots of the second subset for uplink radio communications from the communication terminal apparatus.

9. The method of claim 8, wherein, based on the determination that the communication terminal apparatus is located within an area of the terrestrial cellular mobile communication, all of the plurality of time slots of the first subset and all of the plurality of time slots of the second subset are used for downlink radio communications to the communication terminal apparatus.

10. The method of claim 8, further comprising:
modifying the first subset of time slots and the second subset of time slots based on the determination.

\* \* \* \* \*